United States Patent
Kim et al.

(10) Patent No.: US 9,400,774 B1
(45) Date of Patent: Jul. 26, 2016

(54) MULTI-PAGE WEBSITE OPTIMIZATION

(71) Applicant: OPTIMIZELY, INC., San Francisco, CA (US)

(72) Inventors: Elliot Kim, San Francisco, CA (US); Richard Raykhenberg, San Francisco, CA (US)

(73) Assignee: Optimizely, Inc., San Francisco, CA (US)

( * ) Notice: Subject to any disclaimer, the term of this patent is extended or adjusted under 35 U.S.C. 154(b) by 383 days.

(21) Appl. No.: 13/841,534

(22) Filed: Mar. 15, 2013

Related U.S. Application Data

(63) Continuation-in-part of application No. 13/345,211, filed on Jan. 6, 2012, now Pat. No. 8,839,093.

(60) Provisional application No. 61/432,198, filed on Jan. 11, 2011, provisional application No. 61/496,183, filed on Jun. 13, 2011.

(51) Int. Cl.
 *G06F 17/24* (2006.01)

(52) U.S. Cl.
 CPC ....................................... *G06F 17/24* (2013.01)

(58) Field of Classification Search
 CPC ....... G06F 17/21; G06F 17/212; G06F 17/22; G06F 17/2247; G06F 17/24; G06F 17/243
 USPC ................. 715/234, 273, 277; 705/7.12, 7.13
 See application file for complete search history.

(56) References Cited

U.S. PATENT DOCUMENTS

| | | | | |
|---|---|---|---|---|
| 5,933,811 A * | 8/1999 | Angles | ................... | G06Q 30/02 705/14.56 |
| 7,895,293 B1 * | 2/2011 | Vasilik | .......................... | 709/218 |
| 8,296,643 B1 * | 10/2012 | Vasilik | ................ | G06F 17/3089 715/200 |
| 8,543,900 B1 * | 9/2013 | Kent | .............................. | 715/205 |
| 8,850,305 B1 * | 9/2014 | Kent | .............................. | 715/234 |
| 8,898,560 B1 * | 11/2014 | Kent | .............................. | 715/234 |
| 2002/0078141 A1 * | 6/2002 | Cohen | ................... | G06Q 30/02 709/203 |
| 2005/0120290 A1 * | 6/2005 | Mistry | .................... | G06F 21/10 715/272 |
| 2005/0125722 A1 * | 6/2005 | Mistry | .................... | G06F 21/10 715/251 |
| 2005/0229101 A1 | 10/2005 | Matveyenko et al. | | |
| 2006/0162071 A1 * | 7/2006 | Dixon | ................... | G06Q 30/02 5/93.1 |

(Continued)

OTHER PUBLICATIONS

"Web site;" Microsoft Computer Dictionary; May 1, 2002; Microsoft Press; Fifth Edition; p. 710.*

(Continued)

*Primary Examiner* — Andrew Dyer
(74) *Attorney, Agent, or Firm* — Fenwick & West LLP

(57) ABSTRACT

Webpages are optimizing through the use of experiments that compare the responses of viewers that are either presented with the original webpage or a variant thereof. One or more variants are first defined through the use of a browser-based editor application that initially examines the webpage for a snippet of code. The snippet can be added to the webpage, if missing, and the webpage returned to the editor application. Changes made to the webpage to define a variant are saved in variation code. When the webpage is later requested by multiple viewers, in each instance the viewer receives the webpage with the snippet, the snippet instructs the browser to download a file, and the instructions of the file determine whether the viewer will see the variant or the original webpage. Tracking viewer responses to the webpage and the variant allow a statistical basis for comparison to be developed.

14 Claims, 8 Drawing Sheets

(56) References Cited

U.S. PATENT DOCUMENTS

| | | | |
|---|---|---|---|
| 2007/0271352 A1* | 11/2007 | Khopkar et al. | 709/217 |
| 2008/0140765 A1* | 6/2008 | Kelaita | G06F 17/3089 709/203 |
| 2008/0189156 A1* | 8/2008 | Voda et al. | 705/7 |
| 2008/0249855 A1* | 10/2008 | Collins et al. | 705/14 |
| 2008/0275980 A1 | 11/2008 | Hansen | |
| 2008/0320225 A1* | 12/2008 | Panzer | G06F 17/30902 711/130 |
| 2009/0030859 A1 | 1/2009 | Buchs et al. | |
| 2009/0183084 A1* | 7/2009 | Robertson | G06Q 10/06 715/744 |
| 2009/0282343 A1* | 11/2009 | Catlin et al. | 715/738 |
| 2010/0037150 A1 | 2/2010 | Sawant | |
| 2010/0064281 A1 | 3/2010 | Kimball et al. | |
| 2010/0070876 A1* | 3/2010 | Jain | G06Q 30/02 715/748 |
| 2010/0312810 A1* | 12/2010 | Horton | G06F 17/30749 707/812 |
| 2011/0161825 A1* | 6/2011 | Tierney | G06F 11/3672 715/736 |

OTHER PUBLICATIONS

Office Action for U.S. Appl. No. 13/345,211, Oct. 30, 2013, 21 Pages.
Office Action for U.S. Appl. No. 13/345,211, Feb. 13, 2014, 36 Pages.

* cited by examiner

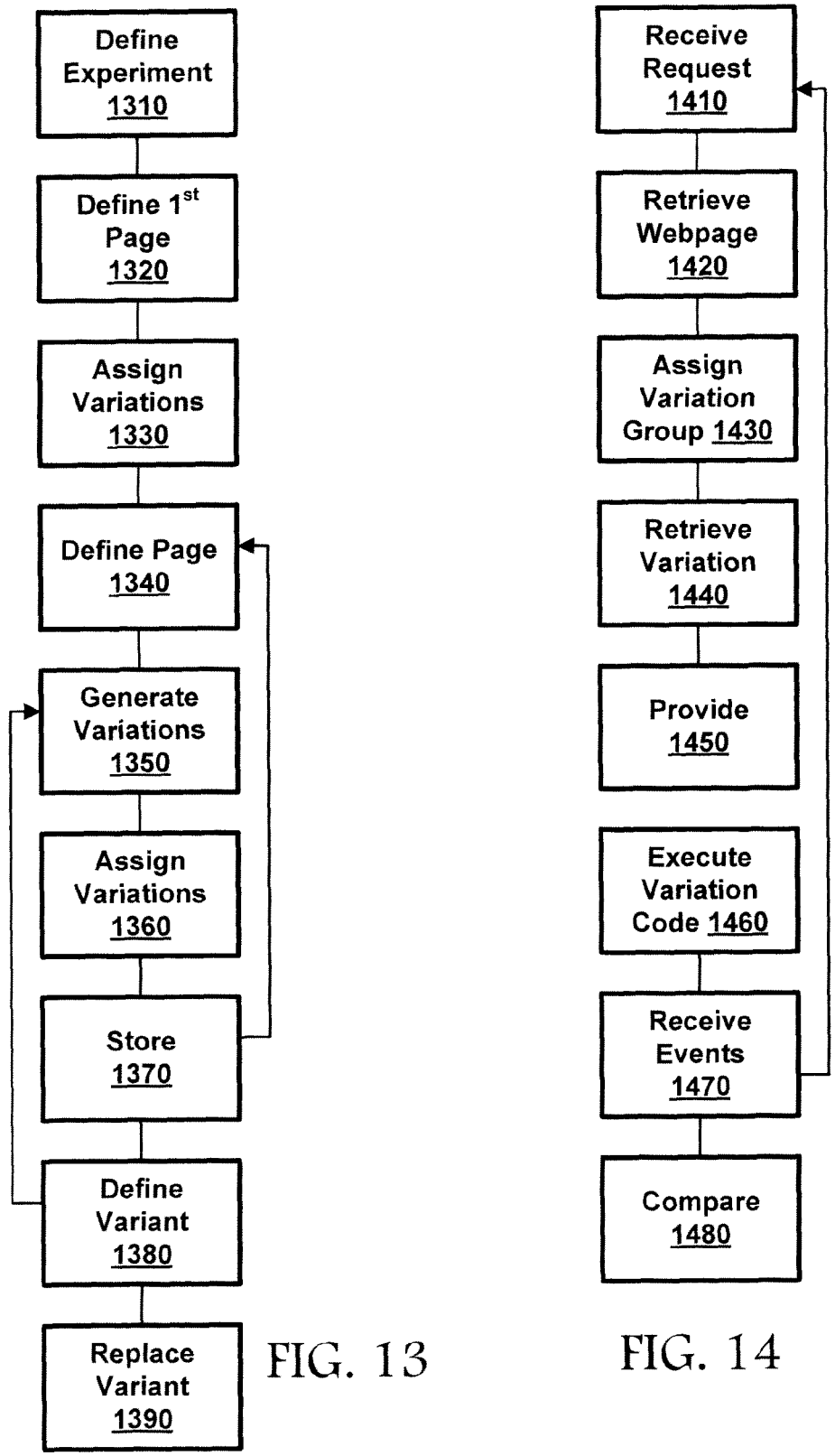

MULTI-PAGE WEBSITE OPTIMIZATION

CROSS-REFERENCE TO RELATED APPLICATIONS

This application is a continuation in-part of U.S. patent application Ser. No. 13/345,211 filed Jan. 6, 2012, which in turn claims benefit and priority to U.S. Provisional Patent Application Ser. No. 61/432,198 filed Jan. 12, 2011 and also to U.S. Provisional Patent Application Ser. No. 61/496,183 filed Jun. 13, 2011, both entitled "Systems and Methods for Website Optimization." The above provisional and non-provisional applications are hereby incorporated herein by reference.

BACKGROUND

1. Field of the Invention

The invention is in the field of webpage design and more specifically in the field of webpage optimization.

2. Related Art

Presently, it is relatively simple to create and publish a webpage on the World Wide Web (WWW). For some purposes, like providing a blog to publicize one's thoughts, the design of a webpage need only serve the tastes of the blogger. However, in other instances webpages are essential to the success of e-commerce and other online endeavors. Whether a potential customer will ultimately make a purchase or navigate away from a webpage depends in large measure on the initial impression that the webpage makes on the potential customer and how well the webpage then fills the needs of the potential customer by making goods or services easy to locate and obtain. It will be appreciated, of course, that these same considerations inform the webpage designs of many entities that are not necessarily seeking to sell anything, such as political and non-profit organizations. Thus, although one can put up a webpage in relatively short order and at little expense, designing a webpage that best serves the interests of an online organization or business can be quite challenging.

Traditionally, the design of webpages has been a matter of trial and error. A web designer creates a webpage, typically according to one's own sense of what works well, publishes the webpage by making the webpage available over the Internet, and waits to see what kind of response the webpage receives through metrics such as the number of views, the number of clicks, sales generated, and so forth. If the webpage is believed to be underperforming in view of these metrics, the web designer can implement changes and then see whether those changes improve or diminish the relevant metrics. A risk inherent in this procedure is that a poorly designed webpage will only be made worse through redesign. Another problem with this approach is that the relevant metrics may change for any number of reasons that are unrelated to the redesign of the webpage, and the respective weights cannot be discerned by simply observing the changes to the metrics. What is needed, therefore, is a means for testing the effectiveness of different designs for a webpage that is simple and quick to implement, that identifies improvements, and that limits the harm done by poor choices.

SUMMARY

The present invention provides methods for optimizing webpages through the use of experiments that compare the responses of viewers when presented with either the original webpage or a variant thereof. An exemplary method for establishing an experiment comprises receiving, with a first computing system such as server, a URL of the webpage to be the subject of the experiment. The exemplary method further comprises serving an editor application to a second computing system that will edit the webpage to create the variant, such as a personal computer. In the exemplary method a snippet of code is added to the webpage, such as to the first line of the webpage, and then the webpage with the snippet of code is served to the second computing system. The exemplary method further comprises receiving, with the first computing system, variation code defining a modification to the webpage. A variant of the webpage results from displaying the webpage with the modification made.

In various embodiments, the webpage is received by the first computing system after the editor application is served to the second computing system, and the snippet of code is added to the webpage by the first computing system. In other embodiments, where the webpage is served by a third computing system behind a firewall, for example, the snippet of code is added to the webpage by the third computing system before the editor application is served to the second computing system. In various embodiments the method further comprises storing the variation code is an experiment file. JavaScript can optionally used for the snippet, the editor application, the variation code, and/or the experiment file.

Another exemplary method of the invention is for optimizing a webpage and broadly encompasses establishing a variant and testing the variant against the original webpage. In this exemplary method a browser-based editor application is provided to a first computing system, such as a personal computer. The method then comprises receiving variation code from the first computing system, where the variation code specifies an element of the webpage and a modification to the webpage. The method additionally comprises storing the variation code in an experiment file, where the variation code is identified with the variant of the webpage. Lastly, the experiment file is repeatedly provided to second computing systems, for example multiple different personal computers, and then receiving from each second computing system that received the experiment file a tracking result in association with either the webpage or the variant. For instance, the tracking result can be whether the element was clicked by the viewer of the webpage or variant.

In various embodiments, further comprises comparing the tracking results for the webpage to the tracking results for the variant after the experiment file has been provided to multiple second computing systems. The exemplary method may additionally comprise, after providing the editor application, receiving a request made by the first computing system for the webpage, requesting the webpage from a third computing system, adding a snippet to the webpage, and serving the webpage with the snippet to the first computing system.

Another exemplary method for optimizing a webpage is performed by a person using a first computing system having a browser. In this method an editor application is run with the browser, where the editor application is configured to display an outer frame and an inner frame, and where the webpage is displayed in the inner frame. The method further comprises selecting an element of the webpage to modify and modifying the element to define a variant of the webpage. Selecting the element and modifying the element can be accomplished using standard graphical user interface tools such as clicking to select, grabbing corners to resize, dragging and dropping, and so forth. The exemplary method also comprises saving the variant, for example, by selecting a save button presented in the outer frame or by a keyboard command.

In various embodiments, the exemplary method further comprises switching the editor application from an editing mode to an interactive mode, interacting with the webpage in the interactive mode, then switching the editor application from the interactive mode back to the editing mode. The switching can be achieved, for example, with controls presented in the outer frame. When in the editing mode, the editor application prevents interaction with the elements of the webpage, but allows selection and modification of the elements.

Still another exemplary method of the present invention is directed to conducting an experiment. In this exemplary method a webpage is requested by a browser of a first computing system, the webpage is received from a second computing system, and then the browser builds a Document Object Model for the webpage. Building the DOM includes executing a snippet of the webpage, where the snippet requests an experiment file from a third computing system. Building the DOM further includes receiving the experiment file and executing the experiment file to modify an element of the DOM before the browser fires an event signifying that the DOM has been built and the page has finished loading. In this disclosure such an event is referred to as a DOMready event and the firing thereof is referred to herein as firing DOMready. In various embodiments executing the experiment file includes randomly selecting variation code within the experiment file, where the variation code specifies the element. In some of these embodiments executing the experiment file further includes determining that the element has not been loaded into the DOM, pausing until after the element has been loaded into the DOM, and then applying a modification specified by the variation code to the element in the DOM.

The present invention also provides a computer-readable medium having stored thereon a set of instructions. The computer-readable medium can be a storage device of a server, such as a magnetic disk, or a Random Access Memory (RAM) of a personal computer, for example. When executed, the set of instructions perform a method comprising displaying an inner frame within an outer frame of a browser window, displaying a webpage within the inner frame, receiving a user selection of an element of the webpage, and generating a unique selector for the element. In various embodiments, the method performed by the set of instructions generates the unique selector for the element as a line of code in JavaScript. Also, in various embodiments, the method performed by the set of instructions further comprises receiving a modification to the element, such as a change in dimension or placement within the webpage, and generating a line of code including the unique selector and a representation of the modification.

Various embodiments of the invention include a method of establishing a multi-page experiment, the method comprising defining an experiment, the experiment being characterized by a status, an experiment identifier, and at least a first variation group and a second variation group; defining a first experiment page having at least a first variation and a second variation; assigning the first variation of the first experiment page to the first variation group; assigning the second variation of the first experiment page to the second variation group; defining a second experiment page; automatically generating a first variation of the second experiment page; automatically generating a second variation of the second experiment page; automatically assigning the first variation of the second experiment page to the first variation group; automatically assigning the second variation of the second experiment page to the second variation group; and storing the assignments of the variations of the first and second experiment pages to the first variation group and the second variation group such that variations assigned to the first variation group a linked together and the variations assigned to the second variation group are linked together.

Various embodiments of the invention include a method of conducting a multi-page experiment, the method comprising receiving a first request from a browser of a first computing system, the request being generated from a first webpage; assigning a variation group of the multi-page experiment to the first computing system, the variation group including variations of multiple webpages; retrieving a variation of the first webpage from the variation group, the variation including variation code configured to modify the first webpage; and providing the variation code to the browser of the first computing system.

Various embodiments of the invention include a system for configuring tests of webpages, the system comprising user interface logic configured to receive characteristics of an experiment, the characteristics including an experiment status, an experiment identifier, and at least a first variation group and a second variation group; page defining logic configured to define experiment pages, each of the experiment pages comprising at least a first variation and a second variation; variation assignment logic configured to assign the first variation and the second variation, of each page, in the alternative to the first variation group or the second variation group; automatic variation generation logic configured to generate page variations such that each variation group includes at least one variation of each page in the experiment; data storage configured to store data in a non-transient manner; storage logic configured to store data records identifying each variation in the first variation group and the second variation group, in the data storage; and a microprocessor configured to execution computing instructions of the automatic variation generation logic.

Various embodiments of the invention include a system for executing tests of webpages, the system comprising request processing logic configured to receive a request from a browser of a first computing system and to request a webpage from a second computing system in response to the request from the browser of the first computing system; assignment logic configured to assign a variation group to the first computing system, the variation group including at least a first variation of a first webpage and a second variation of a second webpage; variation production logic configured to identify the first variation as being applicable to a first webpage, to identify the second variation as being applicable to a second webpage, to apply the first variation to the first webpage, to apply the second variation to the second webpage; and a microprocessor configured to execute computing instructions of the variation production logic.

BRIEF DESCRIPTIONS OF THE DRAWINGS

Figure 4:
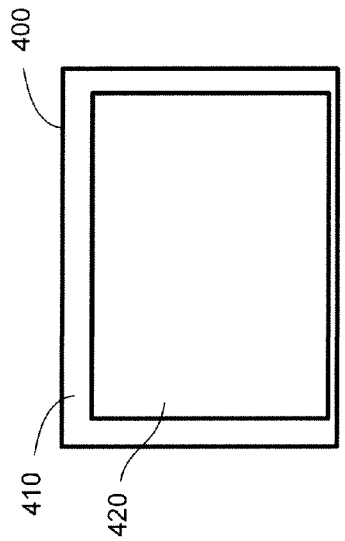

FIG. 4 provides an exemplary browser interface according to an exemplary embodiment of the present invention.

Figure 2:
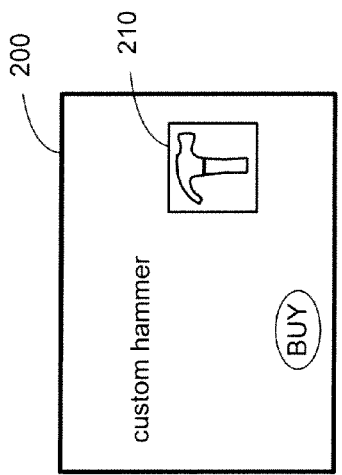
FIG. 2 represents an exemplary webpage that is subject to testing according to various embodiments of the present invention.
Figure 5:
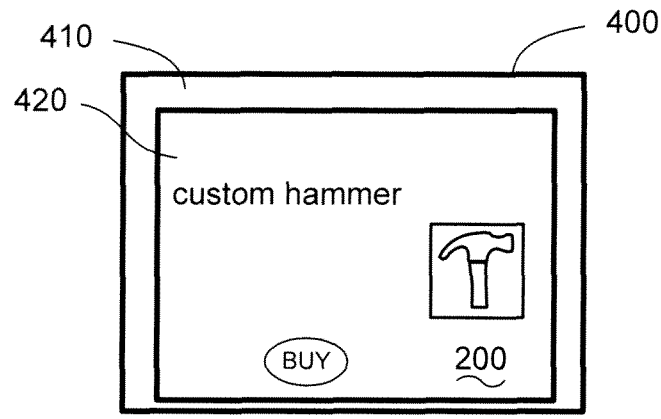

FIG. 5 represents the webpage of FIG. 2 displayed within the browser interface of FIG. 4.

Figure 6:
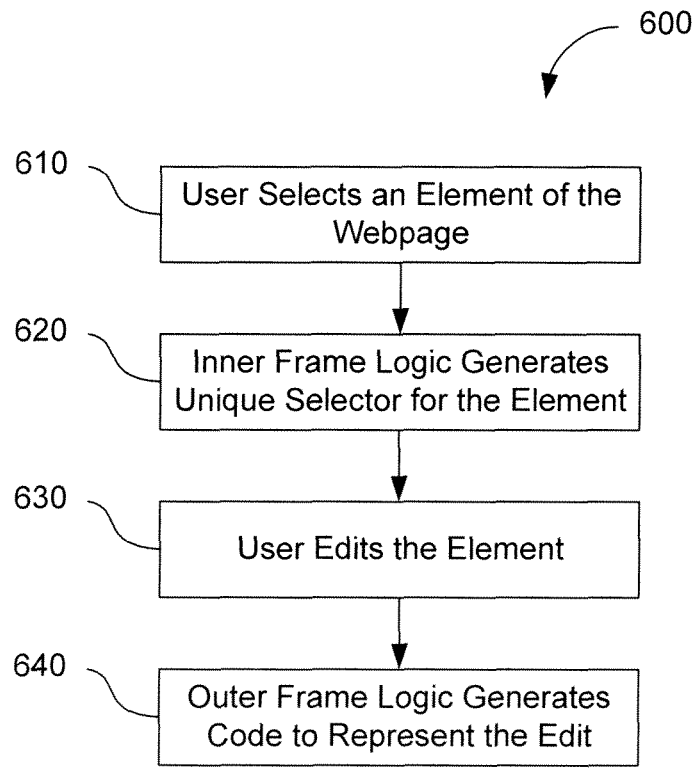

FIG. 6 is a flowchart representation of a method for creating a variant according to an exemplary embodiment of the present invention.

Figure 7:
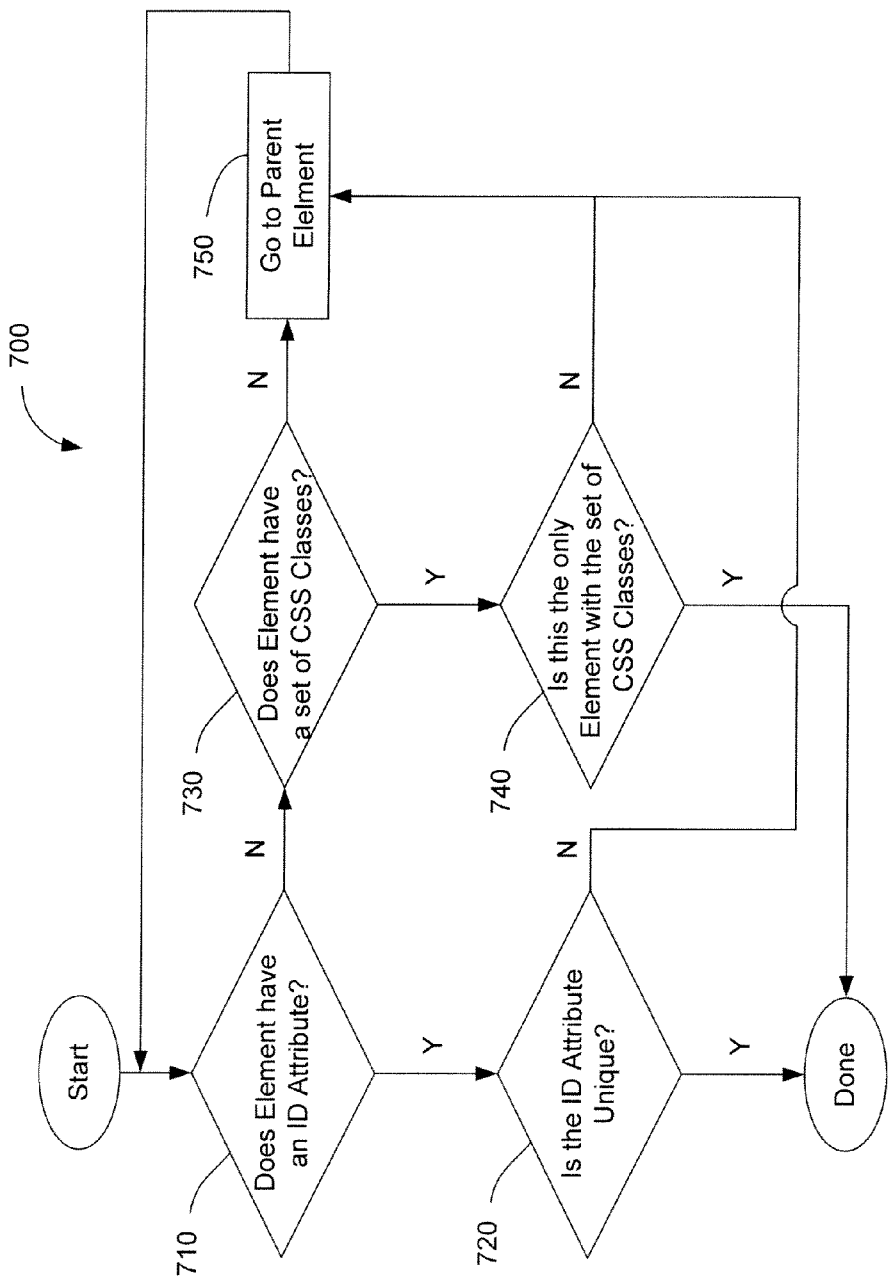

FIG. 7 is a flowchart representation of a method for determining a selector according to an exemplary embodiment of the present invention.

Figure 8:
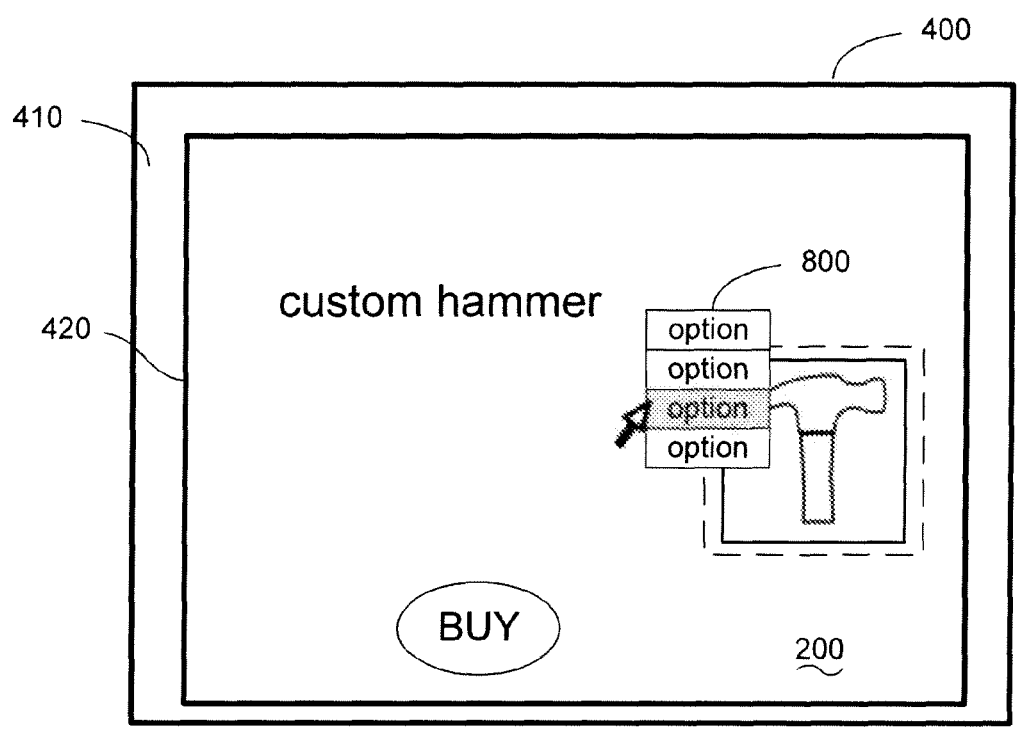

FIG. 8 represents the selection of an element of the webpage of FIG. 2 within the browser interface of FIG. 4.

Figure 9:
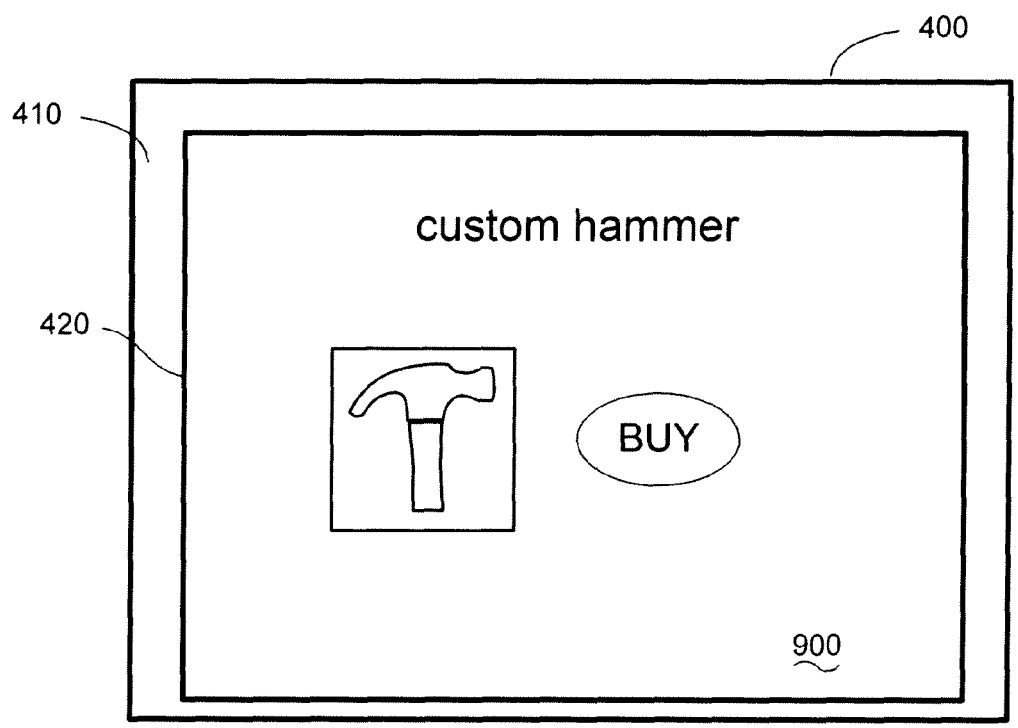

FIG. 9 represents a variant of the webpage of FIG. 2 displayed within the browser interface of FIG. 4.

Figure 10:
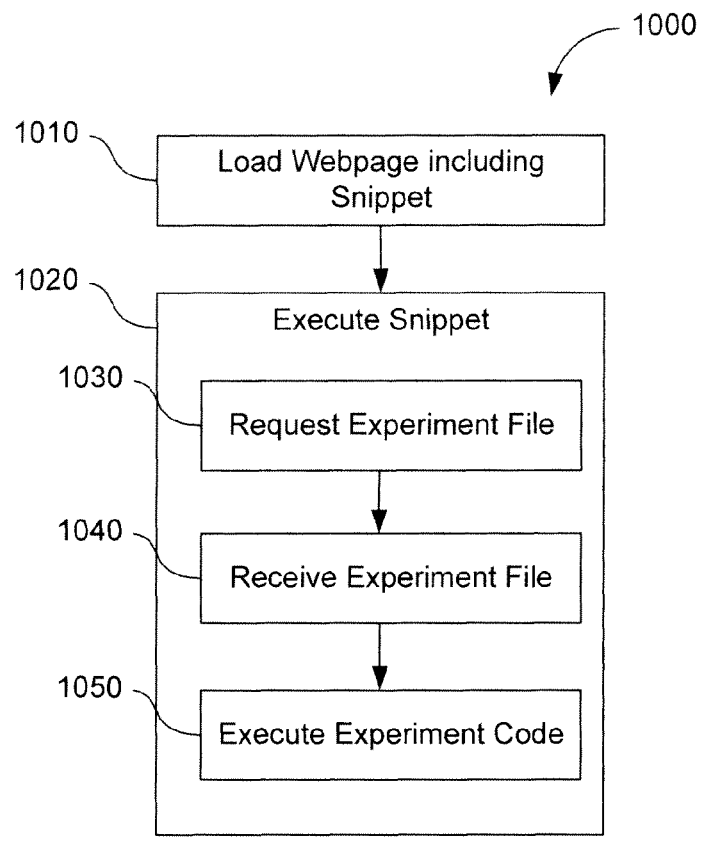

FIG. 10 is a flowchart representation of a method for running an instance of an experiment on a computing system according to an exemplary embodiment of the present invention.

Figure 11:
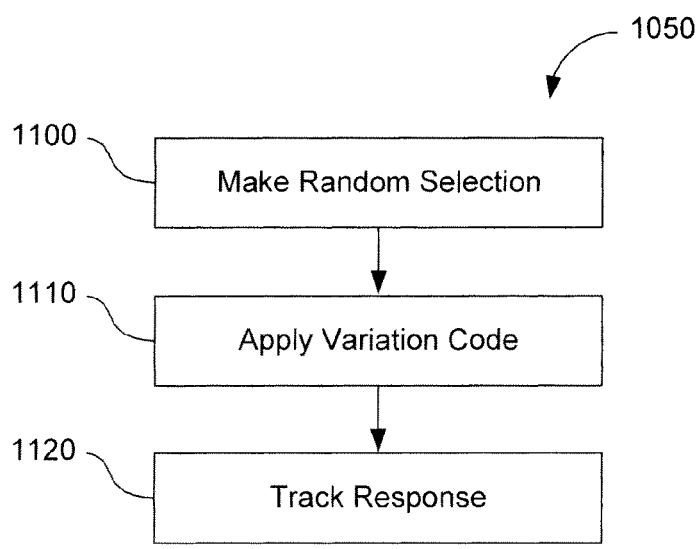

FIG. 11 is a flowchart representation of a method for performing the step of executing the experiment code of FIG. 10 according to an exemplary embodiment of the present invention.

Figure 12:
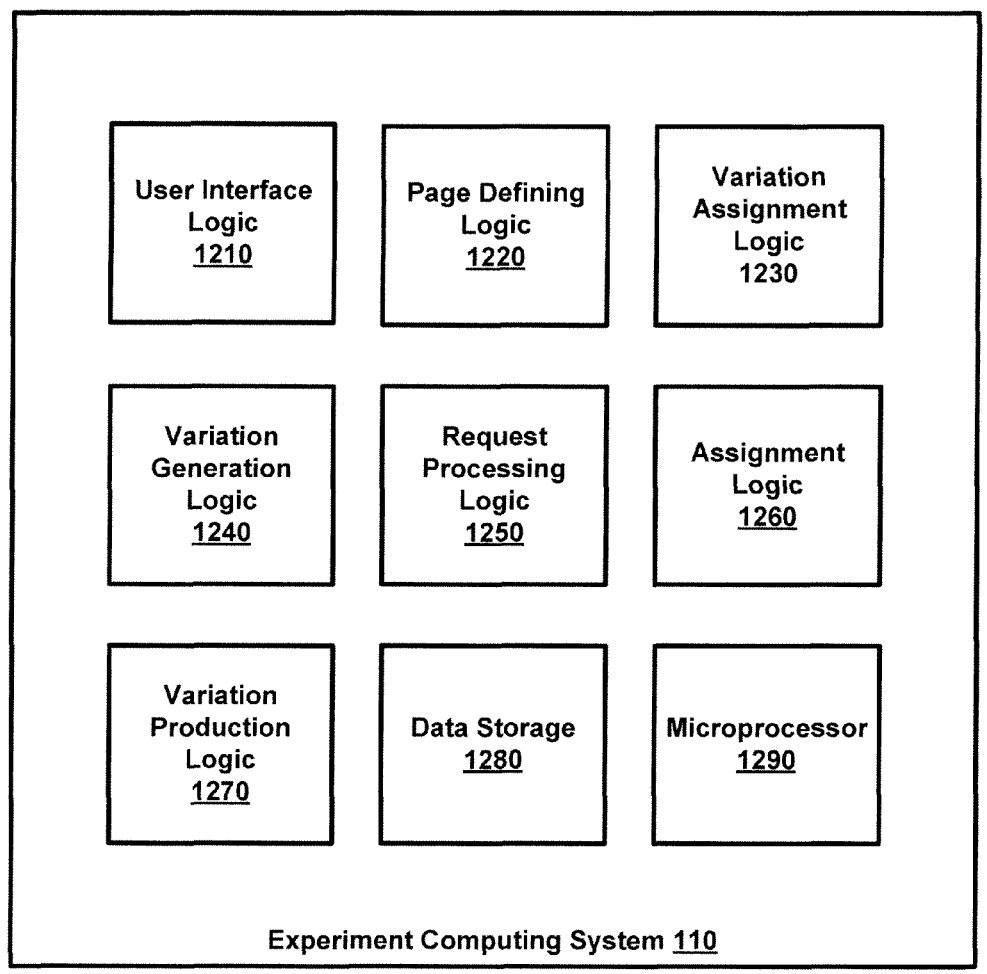

FIG. 12 illustrates further details of Customer Computing System 130, according to various embodiments of the invention.

FIG. 13 illustrates methods of establishing multi-pages experiments, according to various embodiments of the invention.

FIG. 14 illustrates method of performing multi-page experiments, according to various embodiments of the invention.

DETAILED DESCRIPTION

The present invention provides systems and methods for conducting an experiment on a webpage toward the goal of optimizing the presentation thereof. A webpage that is the subject of such an experiment, when requested by a browser, will either appear as originally designed or will appear as some variant thereof. Each variant embodies one or more changes to the original webpage. During an experiment, interactions with the webpage are tracked, and over a span of time, through multiple viewings of the original webpage and its variants by multiple persons, statistics can be developed. From these statistics one can evaluate the variants relative to the original webpage, and to each other, to determine which changes improve the presentation and should be incorporated into the webpage.

In various embodiments the present invention provides an editor for creating variants of a webpage, and methods for editing the webpage to create the variants, and methods that subject webpages to experiments, through the addition of a short code, such as a Javascript code, to each webpage to be tested. The short code simply instructs the browser to fetch additional code from a third-party computing system each time the webpage is loaded. The additional code includes the specific changes that define each variant for an experiment, and instructions that will display either the original webpage or one of the variants. Whichever is displayed by the browser, the original or some variant, the selection is communicated back to the third-party computing system along with any information that the additional code includes instructions configured to track, such as whether the person viewing the webpage makes a purchase, how long the viewer views the page, and so forth.

The present invention also provides a browser-based editor application for creating the variants that will be used in experiments. The editor application can identify whether or not a webpage includes the short code, and if not, requests from the third-party computing system a mirrored copy of the webpage having the short code added thereto. When the browser executes that code after the webpage with the code has been returned, the code causes further code to be retrieved, and that code enables the editor application to fully function. In operation, the editor application disables the ability to interact with the elements of the webpage in the usual manner, such as by clicking through the user interface, and instead allows elements on the webpage to be modified, then records each modification, and communicates the set of changes for each defined variant back to the third-party computing system. Modifications to the webpage that define each variant are added to the code that is returned whenever the code added to the webpage is executed.

When the webpage having the added code is subsequently accessed by a browser that is not configured with the editor application, the code is again executed, and this calls the additional code, now configured with the modifications that define each variant. Additional code necessary to implement the experiment is also returned. This additional code instructs the browser to select a variant, or the original webpage, to present to the viewer. This additional code also reports the selection back to the third-party computing system, as well as any metrics that were determined.

Figure 1:
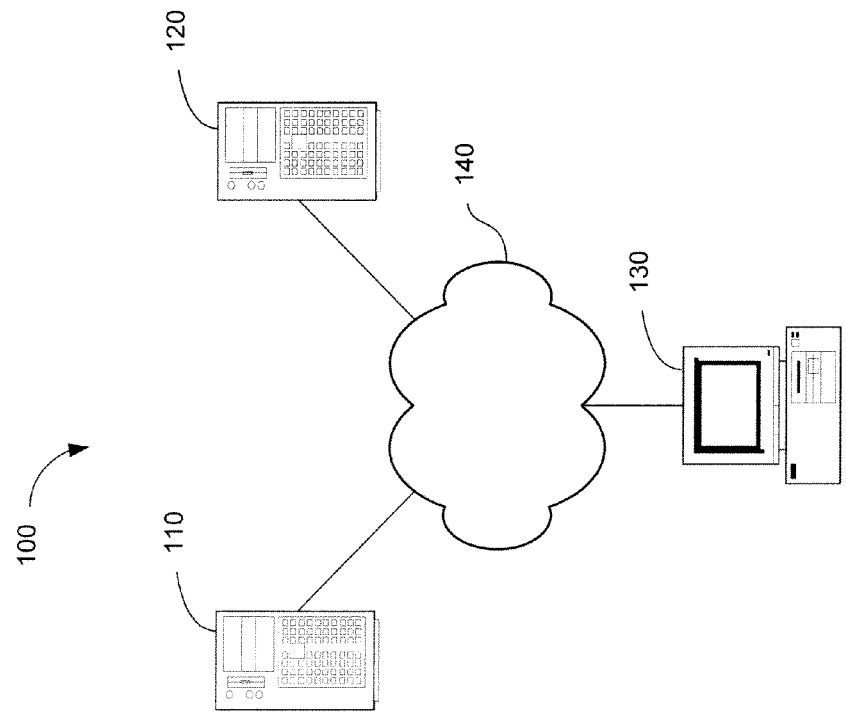
FIG. 1 illustrates an overview of an exemplary networked environment within which the present invention can operate.

FIG. 1 provides an overview of the networked environment 100 in which the present invention operates. The environment 100 includes a first computing system, also referred to herein as an experiment computing system 110 that performs functions in support of experiments such as providing editor applications, adding code to webpages, storing variants of webpages, and aggregating tracking metrics. Experiment computing system 110 is typically controlled by a third-party host that offers the opportunity to website owners to conduct experiments on webpages, to receive statistical analyses, and the like. Experiment computing system 110 can comprise, for example, one or more servers and databases networked together.

The environment 100 also comprises a second computing system, or client computing system 120. Like the experiment computing system 110, the client computing system 120 can comprise one or more servers and databases networked together. The client computing system 120 hosts a webpage identified by a Uniform Resource Locator (URL). The client computing system 120 may make the URL publically accessible over the Internet or may restrict access behind a firewall, for instance. Client computing system 120 is optionally controlled by a different entity than the experiment computing system 110, for example, an online retailer or non-profit organization.

The environment 100 also comprises a third computing system, or customer computing system 130. Customer computing system 130 can comprise, for example, a personal computer (PC), tablet, or smart phone or any device that includes a display, a processor, a platform, and the ability to receive user input and to run a web browser to provide content to the display. The three computing systems 110, 120, 130 each are connected to a wide area network 140 such as the Internet. For the purposes of describing present invention, the customer computing system 130 in FIG. 1 will be understood to serve dual purposes. On one hand, the customer computing system 130 can be used to edit a webpage served by the client computing system 120. In these situations, the customer computing system 130 and the client computing system 120 are controlled by the same entity. The customer computing system 130 is also used herein to represent any computing system that requests a webpage that is the subject of an experiment.

FIG. 2 represents a webpage 200 as viewed in a web browser of the customer computing system 130. The webpage 200 includes a number of elements 210 that can comprise text, images, video, hyperlinks, radio buttons, and so forth. The webpage 200 can be either static or dynamic. As discussed in greater detail below, an experiment conducted on the webpage 200 will include creating a variant in which one or more elements 210 are added, deleted, resized, repositioned, given different attributes such as font, font size, or color, or similarly modified. Different variants of the same webpage 200 can be created and tested in parallel as part of the same experiment.

Figure 3:
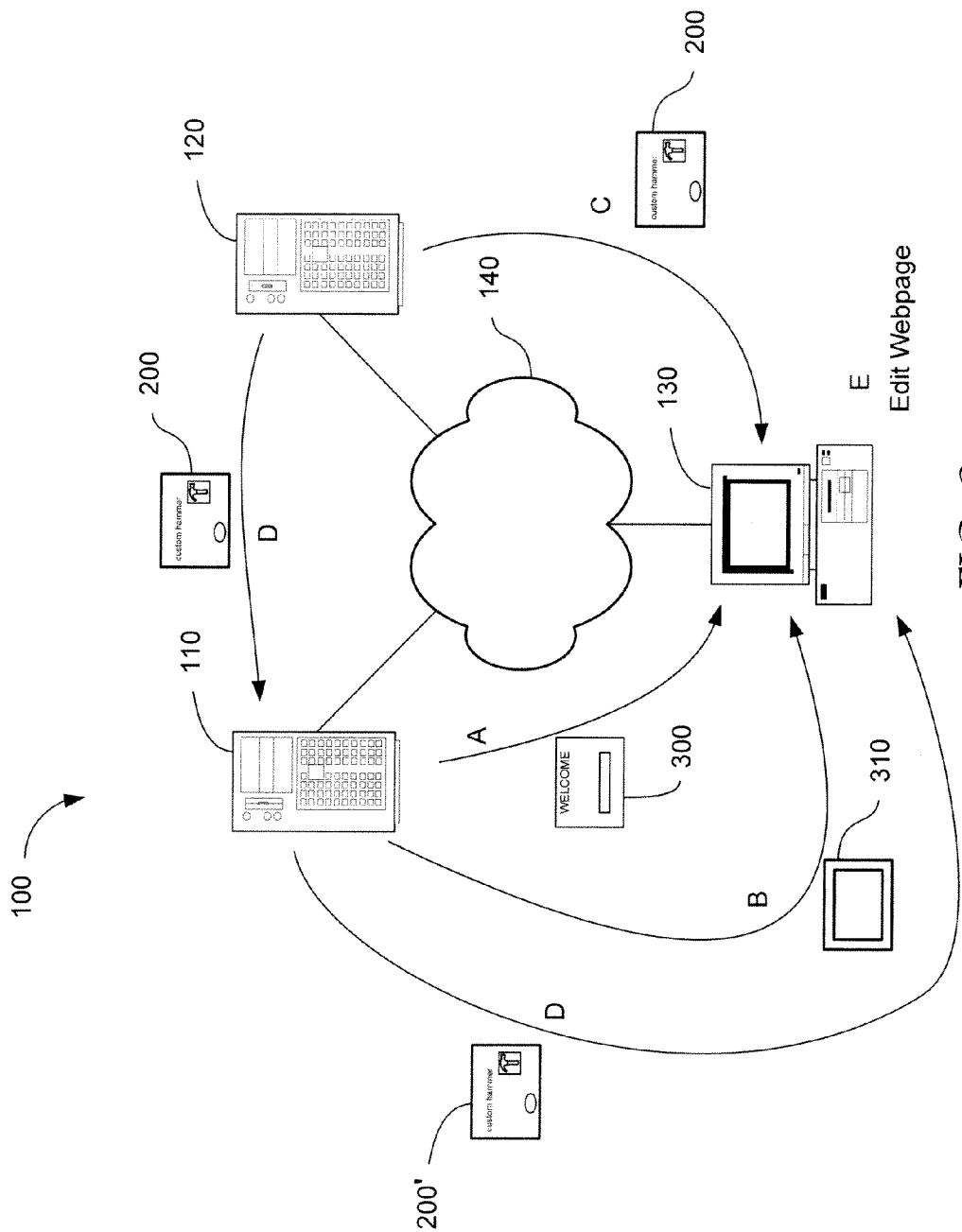
FIG. 3 represents a series of steps performed between computing systems according to exemplary methods of the present invention.

FIG. 3 illustrates an exemplary series of steps between the three computing systems 110, 120, 130 during the creation of a variant of a webpage 200. Initially, in a step A, the customer computing system 130 receives a webpage 300, such as a home page, from the experiment computing system 110. For instance, a browser running on the customer computing system 130 is directed to a URL for the webpage 300, causing the experiment computing system 110 to serve the webpage 300 to the customer computing system 130. The webpage 300 can include a text box, for example, for a user to specify the URL for the webpage 200 to be the subject of an experiment. The URL is then communicated to the experiment computing system 110 which recognizes the receipt of the URL as a request to edit the webpage 200.

Accordingly, in a step B, the experiment computing system 110 serves, and the customer computing system 130 receives, an editor application 310 which the browser of the customer computing system 130 displays to the user through an interface described below. The editor application can be in JavaScript, for example. The browser, when running the editor application 310, provides a user interface within which the user can view the webpage 200, select elements thereof, and modify those elements to create variants without necessarily editing HTML or creating a user account.

FIG. 4 shows an exemplary user interface 400 as displayed by the browser of the customer computing system 130, the user interface 400 comprising an outer frame 410 and an inner frame 420. As used herein, a frame refers to an HTML frame. In an exemplary step B, the browser of the customer computing system 130 loads the outer frame 410 first, where the outer frame 410 includes logic configured to create the inner frame 420 and to direct the inner frame 420 to the URL specified in step A for the webpage 200 for the experiment. HTML frames generally cannot communicate when the content within the frames are derived from different domains, unless both frames explicitly agree ("handshake").

Referring again to FIG. 3, in a step C the inner frame 420 receives the webpage 200 from the client computing system 120. Here, the outer frame 410 and the inner frame 420 are derived from different domains. Further, during step C, the logic of the outer frame 410 is configured to wait for a message from the inner frame 420 until a threshold is reached ("times out"), for example, after 5 seconds. If the message from the inner frame 420 is received (the handshake occurs), the webpage 200 has previously been configured with added code, discussed in more detail below, and the logic of the outer frame 410 proceeds to step E. The lack of a handshake indicates that the webpage 200 has not been previously configured, in which case the logic of the outer frame 410 is configured to remove the inner frame 420 and create a new inner frame 420 directed to a URL on the same domain as the outer frame 410. For example, the new URL can be a mirrored URL of the format edit.example.com/URL.

In a step D, again illustrated by FIG. 3, the experiment computing system 110 receives a request from the inner frame 420 for the mirrored URL, requests and receives the webpage 200 from the client computing system 120, adds a short piece of code to the webpage 200, and serves the modified webpage 200, designated in FIG. 3 as webpage 200', to the inner frame 420. The short piece of code will be referred to herein as a snippet and in various embodiments is written in JavaScript. The snippet is added to the beginning of the code that defines the webpage 200, for example, as the first line of that code. An exemplary snippet has the format:

<script src="//cdn.example.com/js/ID.js"></script> where the ID is a unique identifier assigned to a particular entity conducting one or more experiments. The same entity may have multiple IDs, and the experiment file associated with a particular ID can include experiments for more than one webpage 200. In some embodiments, a snippet includes no more than 65 characters. Each time a browser loads a webpage 200' that includes such a snippet, the snippet is executed, causing the browser to request an experiment file http://cdn.example.com/js/ID.js from cdn.example.com. The experiment file will be expanded through the addition of variation code in the editing process described below, but initially includes instructions that permit the inner frame 420 to send a message to the outer frame 410 to complete the handshake. It is noted that a content delivery network (CDN) can be employed to accelerate delivery of the experiment file, but is not required by the invention.

As provided above, the webpage 200 can be pre-configured so that the handshake is made in step C. For example, the owner of the client computing system 120, having one or more preassigned unique IDs, can have the snippet of code manually added to the webpage 200 to create webpage 200' prior to step A. Such pre-configuration can be useful where the webpage 200 is behind a firewall or authentication wall, and therefore would not be accessible to the experiment computing system 110 in step D. Thus, in these instances, webpage 200' is served to the inner frame 420 in step C, the snippet is executed, the inner frame 420 receives and runs the experiment file, sends the message to the outer frame 410, and the logic of the outer frame 410 then proceeds to step E.

In a step E the webpage 200' is edited by the user of the customer computing system 130 using editing tools made available by the logic of the outer frame 410. FIG. 5 illustrates the webpage 200' as displayed within the inner frame 420 of the user interface 400 during step E. FIG. 6 illustrates an exemplary method 600 of creating a variant of the webpage 200 in step E. In a step 610 the user employs the user interface 400 to select an element 210 of the webpage 200. To allow the user to make this selection, the logic of the outer frame 410 disables the logic of the inner frame 420 that would otherwise allow the user to interact with the webpage 200. Thus, in FIG. 5, for example, the user can no longer select the BUY button to be redirected to another webpage. Rather, the logic of the outer frame 410 is configured to highlight selectable elements 210 of the webpage 200, such as with an outline, when a cursor is moved over, or close to, such selectable elements 210. It will be appreciated that FIG. 5 is an oversimplification showing only three separate elements 210, but in a typical webpage 200 there are often complex hierarchies of such elements 210 involving nesting, for example. The logic of the outer frame 410 is configured to allow the user to select elements 210 at any level within such a hierarchy.

When a user makes a selection of an element 210 in step 610, then in a step 620 the logic of the inner frame 420 is configured to assign to element 210 a string that can be used to uniquely identify this element among all others on the webpage 200'. This string will henceforth be referred to as a "selector" for element 210. The logic of the outer frame 410 can be configured to make the determination using a JavaScript library such as jQuery, for instance. FIG. 7 illustrates an exemplary method 700 for assigning a selector to an element 210 of a webpage 200. In a step 710, the logic of the outer frame 410 is configured to determine whether the element 210 has an ID attribute. If so, in a step 720 the logic determines whether the ID attribute is unique within the webpage 200, and if yes, the method 700 is done and the ID attribute becomes the selector.

If the element 210 does not have an ID attribute in step 710, then the logic of the outer frame 410 is configured to determine whether the element 210 has a set of Cascading Style Sheet (CSS) classes in a step 730. If so, in a step 740 the logic determines whether the element 210 is the only element with that set of CSS classes, and if so, the set of CSS class names is chosen as the selector for element 210 and the method 700 is done. If, in any of the steps 720, 730, or 740 the result is no, then the method 700 goes to a step 750 where the parent element 210 is selected and the method returns to step 710. As soon one element 210 in the ancestor chain of the selected element 210 is uniquely identified the selector becomes a string that defines the selected element 210 in terms of its relationship to the uniquely identified element 210, such as "3rd image child of 4th paragraph child of unique_element."

Returning to FIG. 6, once an element 210 is selected and has a selector, the user can employ the user interface 400 to modify the element 210 in a step 630. FIG. 8 illustrates step 630. Here, the user selects an element 210 on the webpage 200 and the logic of the outer frame 410 is configured to highlight the selected element 210 and bring up a menu 800 of options appropriate for the selected element 210. Exemplary options allow the user to modify or remove elements 210 through typical GUI operations such as dragging and dropping. Other exemplary options allow the user to bring up a dialog box within which the user can edit the HTML or JavaScript directly. Still other options allow the user to add elements 210 not already on the webpage 200. It is noted that method 600 does not require the user to edit HTML, though the option exists in some embodiments. Additionally, the user is not required to create an account to perform method 600.

The editor application can make additional tools available to the user for generating statistics when an experiment is running. As an example, the user can establish various metrics to track such as the number of clicks on an element 210. In various embodiments the outer frame 410 provides such tools, for example.

FIG. 9 shows a variant 900 of the webpage 200 resulting from the rearrangement of elements 210. In a step 640, for each modification to an element 210 of the original webpage 200 the logic of the outer frame 410 stores a line of code, such as JavaScript code, that specifies the selector in association with the modification made to the element 210. When the user is done making modifications, indicated by executing a save command, for example, all of the lines of code specifying changes (collectively referred to herein as the variation code) are communicated back to the experiment computing system 110 where the variation code is stored in a new version of the experiment file. For each variant 900 of the webpage 200 that is defined, another variation code is stored in the experiment file. In some embodiments the outer frame 410 includes tabs, for example, so that the user can switch between the original webpage 200 and any of the variants 900 that have been defined. It will be appreciated, therefore, that the user can design and preview any variant 900 of the original webpage 200 without actually having to make changes to the HTML of the webpage 200.

The discussion above treats elements 210 as static, but many webpages 200 include interactive elements 210, simple examples including modal dialogs and dropdown menus. In some embodiments, therefore, the logic of the outer frame 410 is configured to allow the user to switch between an editing mode in which the logic of the outer frame 410 prevents the user from interacting with webpage 200, and an interactive mode in which the logic of the outer frame 410 allows interaction with the webpage 200 but does not provide editing functions. Switching between modes can be accomplished through controls presented in the outer frame 410, for example.

In various embodiments, when a variant 900 has been partially created, and a user switches from the editing mode to the interactive mode, the logic of the outer frame 410 resets the webpage 200 within the inner frame 420 by redisplaying the cached copy and allows the user to interact with the webpage 200. When the user returns to the editing mode, the logic of the outer frame 410 clones the Document Object Model (DOM) as it exists at that time, modifies the DOM according to the existing variation code, and then allows the user to continue editing.

As noted above, statistics are developed over some length of time by serving the webpage 200' including the snippet multiple times to different customer computing systems 130. Each time the webpage 200' is served to a customer computing system 130 while an experiment is being conducted will be referred to herein as an instance of the experiment. FIG. 10 illustrates an exemplary method 1000 for conducting an instance of an experiment. The method 1000 is performed by each customer computing system 130 that is served the webpage 200'.

Initially, the browser of a customer computing system 130 requests the webpage 200' from the client computing system 120. Persons requesting the webpage 200' do not generally have any reason to know that they will be viewing either the original webpage 200 or a variant 900 thereof within the context of an experiment. In a step 1010 the webpage 200', including the snippet, is loaded by the browser of the customer computing system 130. Since the snippet is in the beginning of the code that specifies the webpage 200', such as the first line, as the browser starts to parse the webpage 200' the snippet is quickly encountered and in a step 1020 the snippet is executed.

Executing the snippet in step 1020 comprises the step 1030 of requesting an experiment file from the experiment computing system 110, the step 1040 of receiving the experiment file, and the step 1050 of executing the experiment code. It is noted that the experiment file includes both the editing code that enables the editing process by allowing the inner frame 420 to communicate with the outer frame 410, as noted above, the experiment code that includes the variation code for each defined variant 900, as well as the additional code for performing other necessary tracking functions.

As shown in FIG. 11, the step 1050 of running the experiment code, in turn, comprises the step 1100 of making a random selection between the options of either no variation code or one of the variation codes provided in the experiment code. In some embodiments these options are weighted equally, while in other embodiments the experiment can be configured such that the original webpage 200 or any variant is selected more or less frequently. In this way, for example, an experiment can be configured such that 80% of the time the original webpage 200 will be presented and only 20% of the time one of the variants 900 will be presented.

In those instances in which a variant 900 has been randomly selected, then in step 1110 the experiment code is configured to then apply the modifications specified by the corresponding variation code. Running the experiment code thus further comprises displaying the variant 900, and in some embodiments displaying the variant 900 includes executing the variation code before the browser fires DOMready, an event that occurs when the HTML is loaded, but potentially before other assets such as images have loaded. For example, the experiment code can be configured to look to the first element 210, specified by the variation code by its selector, and determine whether that element 210 has already been loaded into the browser's DOM. If not, the experiment code waits briefly while the webpage 200' loads and elements 210 continue to load into the DOM, pausing for 50 ms, for example, before checking again.

Once it is determined that the element 210 specified by the variation code has been loaded, the modification specified for the element 210 is applied to that element 210. This is repeated for every element 210 specified by the variation code and then the execution of the variation code is complete. Sometime thereafter, DOMready fires. In some instances, while the experiment code is going through the process of identifying elements 210 and applying the appropriate modifications, the experiment code may encounter a line of code that does not fit this format (e.g., the line of code may have been written and inserted directly by the webpage owner). The experiment code can be configured to suspend execution and wait until DOMready fires, and only then complete the process of applying modifications to elements 210 specified by the variation code.

Other code specified by the experiment file may execute after DOMready in step 1120 to track the response of the viewer to the variant 900. For example, experiment code can be configured to track clicks on various elements 210, whether modified or not. It will be appreciated that in those instances where the original webpage 200 is selected randomly, there is no variation code to apply in step 1110, but step 1120 is still performed. In either situation, the experiment code uploads the results of steps 1100 and 1120 to the experiment computing system 110. The experiment computing system 110 is configured to aggregate the results received for each experiment file, referred to herein as "tracking results," as a function of what the viewer was presented, the original webpage 200 or variant 900.

FIG. 12 illustrates further details of Experiment Computing System 110, according to various embodiments of the invention. These embodiments of Experiment Computing System 110 are optionally capable of performing tests on multiple webpages in series. The multiple webpages are optionally linked together in a variation group. As such, during an experiment, variations of multiple webpages can be assigned to a Customer Computing System 130 as a group. For example, an experiment that includes three different webpages (1-3) for which variations are tested can have multiple variation groups each of which includes a variation for each of the three pages. Specifically, webpage 1 may have variations A, B & C (of webpage 1), In this case each of webpages 2 and 3 will also have separate variations A, B & C, respectively for each webpage. Each variation A is assigned to variation group A, and each variation B is assigned to variation group B, etc. In this example, variation group A includes a variation A for webpage 1, a variation A for webpage 2, and a variation A for webpage 3. Each of these variations can include different modifications of their associated webpages. Likewise, variation group B includes a different variation B for each of the three webpages, etc.

In some embodiments, each variation group includes a variation for each webpage in an experiment. Thus, if there are five webpages and three variation groups, then there will be 15 variations, three for each webpage. As is described further herein, in order to maintain a variation for each page in each variation group it is possible to automatically generate variations when a new webpage or a new variation group is added to an experiment.

An advantage of variation groups is that, in some embodiments, when a user uses Customer Computing System 130 to visit a website they can be pseudo-randomly assigned to a variation group and this assignment can determine which variations they will be shown for any or all variable pages within the experiment. For example, in an experiment that includes showing a product price at the bottom of product webpages verses showing the product price at the top of the product pages, visitors can be assigned one of two variation groups when they first visit a website. A first of these two variation groups includes variations of each experiment webpage that has the price on top and a second of these two variation groups includes variations of that has the price on the bottom. By assigning visitors to one or the other of these variation groups each visitor will consistently see prices located in the same position on each page. The presentation of a specific variation group to a user of Customer Computing System 130 can be maintained as the user navigates from a webpage describing a product (a product page) to a webpage at which the product is purchased (a checkout page).

By assigning variations to variation groups, it is not necessary for experiment webpages within a multi-webpage experiment to have (web) links between each other. For example, a first experiment webpage does not need to include a link to a second experiment webpage, and the second experiment webpage does not need to include a link to the first experiment webpage. Variations within a variation group can share targeting criteria, experiment goals, and/or any of the other criteria discussed herein.

The embodiments of Experiment Computing System 110 illustrated in FIG. 12 include User Interface Logic 1210 configured to receive characteristics defining an experiment from Client Computing System 120 or a local input device. These characteristics can include an experiment status, an experiment identifier (e.g., name), how variation groups should be assigned, experiment type (A/B, multivariate, etc.), experiment variations, experiment goals, targeting criteria, traffic allocated, and/or the like. An experiment may be assigned one, two, three or more variation groups using User Interface Logic 1210. Information, such as variation group assignments, received using User Interface Logic 1210 is optionally stored in a Data Storage 1280 where it can be accessed during experiment execution. User Interface Logic 1210 may also be used to configure specific variations of webpages such as shown elsewhere herein. The status of an experiment can include running, ready to run, paused, complete, etc. User Interface Logic 1210 is optionally configured to provide a user interface to Client Computing System 120 as a webpage within a browser.

User Interface Logic 1210 is optionally further configured to move webpages and associated variations of the webpages from one experiment to another. In some embodiments, a webpage can be assigned to more than one experiment but only one of these experiments can have a status of "running" at the same time. User Interface Logic 1210 is optionally further configured to edit variations or move variations between variation groups.

The embodiments of Experiment Computing System 110 illustrated in FIG. 12 also include Page Defining Logic 1220. Page Defining Logic 1220 is configured to generate variations of webpages as described elsewhere herein. For example, in some embodiments, Page Defining Logic 1220 is configured to provide a web interface to Client Computing System 120 that includes tools to perform the methods illustrated in FIG.

6. These tools include the elements illustrated in FIGS. 8 and 9. Page Defining Logic 1220 is optionally configured to generate two, three or more variations of a single webpage.

The embodiments of Experiment Computing System 110 illustrated in FIG. 12 also include Variation Assignment Logic 1230 configured for assigning variations of each webpage in an experiment to one, two or more variation groups. Variation Assignment Logic 1230 may also be configured to move or copy a variation of a webpage from a first variation group to a second variation group. For example, if a webpage include a variation "A" assigned to a variation group "A" and a variation "B" assigned to a variation group "B," then Variation Assignment Logic 1230 may be used to switch the assignments such that variation "A" is assigned to variation group "B" and variation "B" is assigned to variation group "A." Such a move is optionally directed by a user of Client Computing System 120 using User Interface Logic 1210.

In some embodiments, Variation Assignment Logic 1230 and User Interface Logic 1210 are configured such that a user of Client Computing System 120 receives a graphical layout of the various webpages, variation groups and variations, and the user can drag and drop objects within the layout to indicate desired changes to an experiment, e.g., reassignment of variations to variation groups. These actions are communicated to Variation Assignment Logic 1230 which then modifies data characterizing the experiment, on Experiment Computing System 110, to reflect the changes.

The embodiments of Experiment Computing System 110 illustrated in FIG. 12 optionally also include Variation Generation Logic 1240. Variation Generation Logic 1240 is configured to automatically generate variations of webpages such that each variation group includes at least one variation group of each page in an experiment. Variation Generation Logic 1240 can be used in a variety of different situations. For example, in some embodiments, in response to definition of a new variation for a first webpage and assignment of the new variation to a new variation group, Variation Generation Logic 1240 is used to automatically (e.g., without requiring further user input) generate variations of any or all other webpages in the experiment and to assign these automatically generated variations to the new variation group. As such, the new variation group will automatically be provided with a variation for each webpage in the experiment.

In another example of the use of Variation Generation Logic 1240, a new or previously existing webpage is added to an experiment. In this example, Variation Generation Logic 1240 is, optionally automatically, used to generate at least one variation of the added webpage for each variation group in the experiment.

When a new variation of a webpage is generated Variation Generation Logic 1240 can be configured to define new variations using a variety of approaches. For example, in some embodiments a new variation is produced by copying an existing variation for that webpage. Alternatively, a NULL variation that would result in no changes to original webpage content may be generated as a default. In some embodiments, new variations are generated based on rules or conditions inherited from a variation group in which the generated variation is assigned. For example, a variation group can comprise a rule that prices are reduced by 3% or that a product descriptions include a specific font. Such rules are inherited from the variation group to page variations within the variation group. Other inherited features can include objects such as logo image files, scripts, java code, fonts, color schemes, layout themes, XML or HTML, and/or the like. Inheritance can occur from variation groups to page variations and from variations to sub-variations. Variation Generation Logic 1240 is optionally further configured to automatically generate sub-variations of variations.

The embodiments of Experiment Computing System 110 illustrated in FIG. 12 further include Request Processing Logic 1250. Request Processing Logic 1250 is configured to receive a request from a browser of Customer Computing System 130, the request being for modifications to a webpage. This request may be the result of executing Execute Snippet Step 1020 on the browser of Customer Computing System 130.

The embodiments of Experiment Computing System 110 illustrated in FIG. 12 further include an Assignment Logic 1260. Assignment Logic 1260 is configured for assigning a variation group to Customer Computing System 130. This assignment has the result that when a browser of Customer Computing System 130 is used to request webpages within the experiment, variations of these webpages that are in the assigned variation group will be presented to users at the Customer Computing System 130. Note that assignment typically occurs when one of the webpages in the experiment is first visited using Customer Computing System 130, regardless of the identity of the specific webpage. In other words, assignment can occur when a user first requests any of the pages in an experiment. The assignment and subsequent page variation is not necessarily dependent on an order in which a user views the webpages of the experiment, not necessarily dependent on whether the user visits non-experiment webpages between visiting webpages in the experiment, not necessarily dependent on whether the user visits webpages from a differ domain between visiting webpages in the experiment, and not necessarily dependent on whether the user closes a browser window between visits to webpages in the experiment. Although any of these events are optionally events that can be used in selecting sub-variations during an experiment. In some embodiments Assignment Logic 1260 is used to perform Make Random Selection Step 1100 as illustrated in FIG. 11. In some embodiments, any assignments of Customer Computing Systems 130 to variation groups are cleared when an experiment is restarted.

Assignment Logic 1260 is optionally configured to store an identifier of the Customer Computing System 130 in association with the variation group. This identifier can be an internet protocol (IP) address, a MAC address, an alphanumeric value, or the like. The identifier is optionally generated by Experiment Computing System 110 and stored on Customer Computing System 130, for example an alphanumeric value identifier can be stored in a browser cookie. In some embodiments the identifier is included as a parameter in a universal resource locator.

The assignment of a variation group or sub-variations to an instance of Customer Computing System 130 typically occurs the first time a browser on the Customer Computing System 130 requests a webpage that is included in a running experiment. The assignment can be based on a pseudo-random number, on characteristics of a user of Customer Computing System 130, on a location of Customer Computing System 130, on a referral source (e.g., identity of a link that brought the user to the experiment page), on a login status, on a weighting between different variation groups, new or return visitor status, matching query parameters, using a browser, preferring a specified language, having a specified cookie, coming from a specified URL, have a certain IP address or IP address pattern, triggering a custom event, coming from a specified geographic location, being in a specified visitor segment, satisfying a custom JavaScript condition, and/or the like. A pseudo-random number includes a random number generated by a computing device, a random number within a prescribed range or generated using a prescribed probability distribution.

Assignments of sub-variations the above factors and can additionally be based on events that occur during an experiment. Such events include browser identity, pages visited, user login status change, the cost, number and identities of items in a shopping cart, number of browser windows open, cookie data, triggering a custom event, satisfying a custom condition, the various browser events discussed elsewhere herein, or any combination thereof.

The embodiments of Experiment Computing System 110 illustrated in FIG. 12 further include Variation Production Logic 1270. Variation Production Logic 1270 is configured to produce variations of webpages for presentation to end users on Customer Computing System 130 during an experiment. For example, in some embodiments, Variation Production Logic 1270 is configured to generate variation code and/or to perform Apply Variation Code Step 1110 illustrated in FIG. 11. The generation of variation code is often in response to commands received from a user of Client Computing System 120. In experiments that include multiple webpages Variation Production Logic 1270 is configured to identify variations within an assigned variation group that are applicable to received requests. For example, Variation Production Logic 1270 may be configured to identify a first variation within a variation group as being applicable to a first webpage and to identify a second variation as being applicable to a second webpage, etc. Variation Production Logic 1270 is then configured to apply each variation to the identified respective webpage and/or send the variation to Customer Computing System 130, when requested by Customer Computing System 130, e.g., to send variation code to Customer Computing System 130 such that the variation code is executed to produce variations of webpage(s).

Data Storage 1280 includes memory configured to store the various logic elements illustrated in FIG. 12, as well as data characterizing experiments, webpages and/or variations thereof. The memory is a computer readable medium and can be electronic or optical, static, volatile, non-volatile, non-transitory, and/or the like. In some embodiments, Data Storage 1280 includes random access memory and a hard drive.

In some embodiments, Data Storage 1280 includes storage logic configured to store, in the memory, data records identifying each variation of webpages within one or more variations groups. For example, in some embodiments Data Storage 1280 can further include a database and associated database logic.

Microprocessor 1290 is a digital processor configured to execute one or more of the various logic elements (e.g., 1210-1270) illustrated in FIG. 12. Experiment Computing System 110 optionally includes more than one Microprocessor 1290, which may be in different locations. In some embodiments Microprocessor 1290 includes a general purpose central processing unit (CPU) that has be modified using computing instructions of one or more of the various logic elements 1210-1270. The various logic elements 1210-1270, and storage logic of Data Storage 1280, each include hardware, firmware or software stored on a non-transitory computer readable medium.

FIG. 13 illustrates methods of establishing multi-pages experiments, according to various embodiments of the invention. These methods are optionally performed using the various systems taught elsewhere herein. In these methods one or more webpages are selected is being part of an experiment and variation groups are defined to characterize how the original webpages should be varied as part of the experiment.

In a Define Experiment Step 1310 an experiment is defined. The experiment can be characterized by an experiment status, by an experiment identifier (e.g., name), by experiment goals, target criteria, events tracked, experiment type, experiment variations, traffic allocated, and/or the like. In multipage experiments, the experiment can also be characterized by two or more variation groups. These variation groups can inherit attributes of the experiment, such as events tracked, and may be based on specific rules as discussed elsewhere herein. In some embodiments the variation groups can include sub-variation groups that inherit attributes of their parent variation group but provide for different versions of an experiment page within the same variation group.

In a Define $1^{st}$ Page Step 1320 a first experiment page is defined as being part of the experiment. The first experiment page has at least a first variation and a second variation. The first variation may be an original version of the page, and the second variation may be a modified version of the first variation. As discussed elsewhere herein, the variations of a page can include a wide variety of modifications to page content, page layout, and/or page functionality. Define $1^{st}$ Page Step 1320 is optionally performed using any of the various user interfaces discussed elsewhere herein. Define $1^{st}$ Page Step 1320 optionally includes adding the snippet of code, discussed elsewhere herein, to the webpage. When executed on Customer Computing System 130 this snipped of code typically requests a webpage variation from Experiment Computing System 110.

In an Assign Variations Step 1330 one, two or more variations of the first experiment page are assigned to variation groups of the experiment. In some cases each variation of the first experiment page in assigned to a different variation group. In some cases, two or more of the variations of the first experiment page are assigned to a same variation group as sub-variations. These sub-variations are optionally in a hierarchical relationship with a parent variation of the first experiment. Typically, variations assigned as sub-variations are related in that they can inherit features from their parent variation. In some embodiments, Assign Variations Step 1330 includes assigning a first variation to a first variation group and a second variation to a second variation group, etc.

In a Define Page Step 1340 an additional experiment webpage is defined. This webpage may be a $2^{nd}$ webpage of the experiment, or if Define Page Step 1340 has been previously performed a $3^{rd}$, $4^{th}$, or further webpage of the experiment. An experiment can include a large number of webpages. Define Page Step 1340 optionally includes defining characteristics of a webpage that are not apparent to an end user of Customer Computing System 130 but are related to how variations of the webpage are handled. For example, Define Page Step 1340 can include specifying that each variation of the webpage shall include two different sub-variations, or which of the various methods for automatic variation generation discussed herein is to be used to generate variations for the webpage. Thus, characteristics defined for a webpage can be used by Variation Generation Logic 1240 to make variations.

In a Generate Variations Step 1350 variations of the webpage defined in Define Page Step 1340 are generated. The generation of these variations is optionally performed automatically in response to the definition of the webpage. As used with respect to the generation of webpage variations the term "automatically" is meant to mean that a variation, or aspects of the variation, is generated without requiring further user input. For example, in some embodiment when a user executes a "save" command during Define Page Step 1340 Variation Assignment Logic 1230 is used to automatically create a variation of the saved webpage for each variation group defined in the experiment. Each of the variations created optionally inherit characteristics of their respective variation group. In other embodiments, Generate Variations Step 1350 includes generating variations for each variation group, the variations being partially defined based on inherited characteristics, but requiring further selections or definition of characteristics by a user. In some embodiments, Generate Variations Step 1350 includes presenting a user of Experiment Computing System 110 with a menu that allows the user to select how variations (individually or as a group) are to be generated. This manual can allow a user to select generation from a default, from a copy of a previous variation (or original page), from an inheritance of characteristics, from one or more rules, and/or from manual specification.

In an Assign Variations Step 1360 the webpage variations generated in Generate Variations Step 1350 are assigned to variation groups of the experiment. This assignment is typically automatic. As in Assign Variations Step 1330, there is a typically a 1-to-1 relationship between variations and variation groups. However, a variation can include two or more related sub-variations. In some embodiments, a first variation of a second experiment page is assigned to a first variation group and a second variation of a second experiment page is assigned to a second variation group. Generate Variations Step 1350 and Assign Variations Step 1360 are optionally performed in parallel. For example, each webpage variation may be assigned as it is generated.

In a Store Step 1370 the assignments of the variations generated in Generate Variations Step 1350 to the respective variation groups is stored in Data Storage 1280. For example, variations of a first and second experiment webpages can be assigned to first and second variations groups, respectively. This links the variations assigned to the first variation group together, and links the variations assigned to the second variation group together.

Following Store Step 1370, other steps illustrated in FIG. 13 may be repeated. For example, Define Page Step 1340 may be repeated to generate additional pages within the experiment. Such a repeat of steps can be used to produce multiple webpages in an experiment, each having multiple variations.

In an optional Define Variant Step 1380 a new variation is added to an existing experiment. The new variation can be for any of the experiment webpages of the experiment. The new variant is associated with a new variation group. Define Variant Step 1380, therefore, optionally includes defining which characteristics of the new variation are also characteristics of the new variation group and, thus can be inherited by other variations within the variant group. The new variation added in Define Variant Step 1380 is optionally added by modifying a webpage, or previously existing variation, as discussed elsewhere herein.

The result of Define Variant Step 1380 may be a new variation group that initially does not include a variation for each webpage in an experiment. In some embodiments it is therefore desirable to follow Define Variant Step 1380, in which a new variant group is started, with a repeat of Generate Variations Step 1350 in which corresponding variations for the rest of the variation groups of the experiment are generated. The definition of a new variation for one page in an experiment (assigned to a first variation group) may, thus, result in the automatic generation of variations for other webpages in the experiment. These automatically generated variations are automatically assigned to other variation groups. The methods illustrated in FIG. 13 may include definition of further experiment webpages and/or variations and in response generation of additional variation groups and/or variations.

In an optional Replace Variant Step 1390 a request is received to replace a first variation of a first experiment page with a second variation of the first experiment page, e.g., a variation from one variation group is moved to another variation group. This replacement can occur in several fashions. In some cases, when a request is received to replace a first variation of a first experiment webpage with a second variation of the first experiment page (in a first variation group), the second variation of the first experiment webpage is reassigned to the first variation group. The second variation is optionally reassigned to the first variation group as a sub-variation. Alternatively, the second variation of the first webpage may be removed from the second variation group and a third variation of the first webpage is automatically generated and assigned to the second variation group. Alternatively, variations in the first and second variations groups are exchanged.

FIG. 14 illustrates method of performing multi-page experiments, according to various embodiments of the invention. In these methods requests are receive from multiple webpages within an experiment and variations of these webpages are presented to a user of Customer Computing System 130. The presented webpages are modified using variations within a variation group assigned to the Customer Computing System 130.

In a Receive Request Step 1410 a request is received from Customer Computing System 130 for a first webpage or variation code configured for modifying a first webpage. The request is received at Experiment Computing System 110. This request may be the result of a browser executing a snippet of code within a webpage. As described elsewhere herein the snippet can be configured to request a variation that includes modifications to a webpage. The snippet is optionally further configured to modify the webpage using received variation code before the webpage is presented to a user of Customer Computing System 130.

In an optional Retrieve Webpage Step 1420 a copy of the first webpage is retrieved from Client Computing System 120 by Experiment Computing System 110. Retrieve Webpage Step 1420 is optional in embodiment wherein the first webpage is already stored on Experiment Computing System 110 or only the modifications of a webpage requested by Customer Computing System 130 from Client Computing System 120 are required. For example, Retrieve Webpage Step 1420 can be optional in embodiments in which the actual modification of the webpage occurs on Customer Computing System 130. In these embodiments, the webpage is typically received by Customer Computing System 130 from Client Computing System 120.

In an optional Assign Variation Group Step 1430 the instance of Customer Computing System 130 from which the request was received in Receive Request Step 1410 is assigned a variation group. This assignment is optionally performed using Assignment Logic 1260 using a pseudo-random number, event, characteristic, and/or criteria, described elsewhere herein. The assignment optionally includes modification of a browser cookie on Customer Computing System 130 such that the cookie can be read later to identify Customer Computing System 130 as already being assigned to the variation group.

In some embodiments, Assign Variation Group Step 1430 includes reading a browser cookie stored on Customer Computing System 130 and using data within the read cookie to identify that this instance of Customer Computing System 130 is already assigned to a variation group. In some embodiments, Assign Variation Group Step 1430 includes determining that Customer Computing System 130 is not currently assigned to a variation group and then pseudo-randomly assigning Customer Computing System 130 to a variation group, from among a plurality of alternative variation groups within the experiment. In some embodiments, Assign Variation Group Step 1430 includes using an identifier of the Customer Computing System 130 to select the variation group assigned from among a plurality of alternative variation groups of the experiment, the identifier of the instance of Customer Computing System 130 being previously associated with the selected variation group. Previous association may occur, for example, in a previous execution Assign Variation Group Step 1430.

In a Retrieve Variation Step 1440 the assigned variation group and identify of the webpage from which the request was received in Receive Request Step 1410 (information included in the snippet), is used to retrieve a variation of the webpage. In some embodiments the variation retrieved is also dependent on browser events that have previously occurred. For example, any a pseudo-random number, an event, a characteristic and/or criteria, described elsewhere herein can be used to select and retrieve a sub-variation.

In a Provide Step 1450 the variation of the webpage retrieved in Retrieve Variation Step 1440 is provided to Customer Computing System 130. The variation may be received as variation code. The variation is typically received within a browser on Customer Computing System 130, wherein it is used to modify the webpage loading in the browser.

In an optional Execute Variation Code Step 1460 the variation code of the variation provided in Provide Step 1450 is executed on Customer Computing System 130 to modify a webpage. In typical embodiments, this execution will result in modification of a webpage already stored at Customer Computing System 130, but not yet displayed to a user of that system. Execute Variation Code Step 1460 is optional, for example, in embodiments wherein this step is performed by a third party. In some embodiments, the execution occurs on Experiment Computing System 110 and the modified webpage that results is provided to Customer Computing System 130 in Provide Step 1450 after Execution Variation Code Step 1460.

In an optional Receive Events Step 1470 browser events are received from the webpage resulting from Execute Variation Code Step 1460. If Receive Events Step 1470 occurs more than once then browser events can be received from a first webpage, a second webpage and optionally further webpages. Such browser events are discussed elsewhere herein and can include clicks, selections, page views, presentation of video or audio, login, purchases, receipt of user input to a webpage, and/or the like.

In an optional Compare Step 1480 a combination of first and second browser events received in Receive Events Step 1470 from at least the first and second webpages are compared with common experiment goals and/or targeting criteria. In this way events received from multiple webpages in an experiment can be combined to produce a measure of the results of an experiment. For example, clicks from multiple pages can be combined to measure a success rate for presenting an advertisement on several webpages within an experiment.

The Steps 1410 through 1470 or 1480 are optionally repeated such that multiple requests for different webpages are received from the same Customer Computing System 130, the instance of Customer Computing System 130 is repeatedly assigned to the same variation group, and multiple variations from this variation group are retrieved and provide to modify the respective webpages by executing variation code.

Computing systems referred to herein can comprise a microprocessor, a personal computer, a server, a distributed computing system, a communication device, a network device, or the like, and various combinations of the same. A computing system may also comprise one or more computer-readable media including volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing digital information, such as in a database. A computing system, as used herein, expressly requires at least some of the hardware noted above and expressly excludes pure software. The various examples of logic noted above can comprise hardware, firmware, or software, ("code") stored on a computer-readable medium, or combinations thereof. A computer-readable medium, as used herein, expressly excludes paper and carrier waves. Computer-implemented steps of the methods noted herein can comprise a set of instructions stored on a computer-readable medium that when executed cause the computing system to perform the steps. A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data.

Several embodiments are specifically illustrated and/or described herein. However, it will be appreciated that modifications and variations are covered by the above teachings and within the scope of the appended claims without departing from the spirit and intended scope thereof. For example, while the examples taught herein are presented in reference to experiments on webpages that may be directed at meeting specific goals, in alternative embodiments the same teachings are adapted to variation of webpages in non-experimental usage. For example, the systems and methods taught herein are optionally used to present different variations of webpages to different customers in a full production mode. The systems and methods disclosed herein can also be adapted to media other than webpages, such as video and/or audio delivered via a network.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A method of conducting a multi-page experiment, the method comprising:
   storing a first variation group for a multi-page experiment of a website that includes a plurality of web pages, the first variation group including:

a first variation of each of the plurality of web pages of the website that is unique to the first variation group, and a variation sub-group for a first variation of at least one web page from the plurality of web pages of the website where the variation sub-group includes variations of the at least one web page that are distinct from the first variation of the web page;

storing a second variation group for the multi-page experiment of the website that includes the plurality of web pages, the second variation group including:

a second variation of each of the plurality of web pages of the website that is unique to the second variation group, and the second variation of each of the plurality of web pages being distinct from a corresponding first variation of the web page included in the first variation group, and a variation sub-group for a second variation of at least one web page from the plurality of web pages of the website where the variation sub-group includes variations of the at least one web page that are distinct from the second variation of the web page;

receiving a first request from a browser of a first computing system, the request being generated for a first web page included in the plurality of web pages of the website;

assigning either the first variation group or the second variation group to the first computing system;

retrieving a variation of the first web page from the assigned variation group, the variation of the first web page including variation code configured to modify the first web page;

providing the variation code to the browser of the first computing system;

receiving an event that occurred on the variation of the first web page that is indicative of an interaction with the variation of the first web page by the first computing system; and assigning a variation sub-group from the assigned variation group to the first computing system based on the received event.

2. The method of claim 1, wherein assigning either the first variation group or the second variation group to the first computing system includes determining that the first computing system is not currently assigned to a variation group and then pseudo-randomly assigning the first computing system to one of a plurality of alternative variation groups of the experiment that include the first variation group and the second variation group.

3. The method of claim 1, wherein assigning either the first variation group or the second variation group to the first computing system includes using an identifier of the computing system to determine whether to assign the first computing system to the first variation group or the second variation group, the identifier of the computing system being previously associated with the selected variation group.

4. The method of claim 1, further comprising:
receiving a second request from the browser of the first computing system for a second web page included in the plurality of web pages of the website;
retrieving the second web page in response to the request;
retrieving a variation of the second web page from the previously assigned variation group, based on the assignment of the variation group to the first computing system, the variation of the second web page including variation code configured to modify the second web page; and providing the variation code of the variation of the second web page to the first computing system.

5. The method of claim 4, further comprising executing the variation code of the variation of the second web page to modify the second web page.

6. The method of claim 4, further comprising:
receiving first events from the modified first webpage provided to the first computing system;
receiving second events from the modified second webpage provided to the first computing system; and
comparing a combination of the first and second events with a common targeting criteria.

7. The method of claim 4, wherein the variation of the first web page provided on the browser lacks a link to the variation of the second web page, and the variation of the second web page lacks a link to the variation of the first web page.

8. The method of claim 1, wherein assigning either the first variation group or the second variation group to the first computing system includes pseudo-randomly assigning a variation sub-group to the first computing system.

9. The method of claim 8, wherein the assignment of the variation sub-group to the first computing system is dependent on a characteristic of a user of the first computing system.

10. The method of claim 1, further comprising executing variation code of the variation of the first webpage to modify the first webpage.

11. A system for executing tests of webpages, the system comprising:
a data storage configured to:
store a first variation group for a multi-page experiment of a website that includes a plurality of web pages, the first variation group including:
a first variation of each of the plurality of web pages of the website that is unique to the first variation group, and
a variation sub-group for a first variation of at least one web page from the plurality of web pages of the website where the variation sub-group includes variations of the at least one web page that are distinct from the first variation of the web page;
store a second variation group for the multi-page experiment of the website that includes the plurality of web pages, the second variation group including:
a second variation of each of the plurality of web pages of the website that is unique to the second variation group, and the second variation of each of the plurality of web pages being distinct from a corresponding first variation of the web page included in the first variation group; and
a variation sub-group for a second variation of at least one web page from the plurality of web pages of the website where the variation sub-group includes variations of the at least one web page that are distinct from the second variation of the web page;
one or more microprocessors configured to execute instructions, the instructions when executed by the one or more computer processors causes the one or more computer processors to perform steps comprising:
receive a first request from a browser of a first computing system for a first web page included in the plurality of web pages of the website and to request the first webpage from a second computing system in response to the request from the browser of the first computing system;
assign either the first variation group or the second variation group to the first computing system;

retrieve a variation of the web page from the assigned variation group that includes variation code configured to modify the first web page, provide the variation code to the browser of the first computing system;

receive an event that occurred on the variation of the first web page that is indicative of an interaction with the variation of the first web page by the first computing system; and assign a variation sub-group from the assigned variation group to the first computing system based on the received event.

12. The system of claim 11, wherein the request is generated by the browser by processing a webpage received from the second computing system.

13. The system of claim 11, wherein the instructions when executed by the one or more microprocessors causes the one or more microcomputer processors to perform further steps comprising:

assign either the first variation group or the second variation group to the first computing system based on information retrieved from a cookie on the first computing system.

14. The system of claim 11, wherein the instructions when executed by the one or more microprocessors causes the one or more microcomputer processors to perform further steps comprising:

assign either the first variation group or the second variation group to the first computing system based on a characteristic of a user of the first computing system.

* * * * *